(12) United States Patent
Guo et al.

(10) Patent No.: US 9,073,041 B2
(45) Date of Patent: Jul. 7, 2015

(54) PRECIPITATED SILICA SORBENTS AND METHOD OF SEPARATING MATERIALS FROM A FLUID STREAM

(75) Inventors: Qunhui Guo, Murrysville, PA (US); Carol L. Knox, Apollo, PA (US); Raphael O. Kollah, Wexford, PA (US); Justin J. Martin, Jeannette, PA (US); Shantilal M. Mohnot, Murrysville, PA (US); Timothy A. Okel, Trafford, PA (US); Daniel E. Rardon, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 232 days.

(21) Appl. No.: 13/599,308

(22) Filed: Aug. 30, 2012

(65) Prior Publication Data

US 2013/0228521 A1    Sep. 5, 2013

Related U.S. Application Data

(60) Provisional application No. 61/555,508, filed on Nov. 4, 2011.

(51) Int. Cl.
| | |
|---|---|
| *C02F 1/28* | (2006.01) |
| *B01J 20/28* | (2006.01) |
| *B01J 20/32* | (2006.01) |
| *B01D 69/14* | (2006.01) |
| *C01B 33/18* | (2006.01) |
| *C01B 33/193* | (2006.01) |
| *B01J 20/10* | (2006.01) |

(52) U.S. Cl.
CPC ...... *B01J 20/28057* (2013.01); *B01J 20/28033* (2013.01); *B01J 20/28069* (2013.01); *B01J 20/3208* (2013.01); *B01J 20/3236* (2013.01); *B01D 69/148* (2013.01); *C01B 33/18* (2013.01); *C01B 33/193* (2013.01); *B01J 20/103* (2013.01); *B01J 20/28078* (2013.01); *B01J 20/28088* (2013.01); *C02F 1/281* (2013.01); *C01P 2006/12* (2013.01); *C01P 2006/19* (2013.01)

(58) Field of Classification Search
USPC .......................... 423/339, 335; 210/660–661
See application file for complete search history.

(56) References Cited

U.S. PATENT DOCUMENTS

| | | | |
|---|---|---|---|
| 5,194,279 A | 3/1993 | Okel | |
| 7,071,257 B2* | 7/2006 | Esch et al. | 524/493 |
| 7,566,433 B2* | 7/2009 | Stenzel et al. | 423/335 |
| 7,604,687 B2 | 10/2009 | Miller et al. | |
| 2002/0022085 A1* | 2/2002 | Thise et al. | 427/215 |
| 2003/0003040 A1* | 1/2003 | Lindner et al. | 423/335 |
| 2003/0082090 A1 | 5/2003 | Blume et al. | |
| 2003/0124069 A1* | 7/2003 | Cornelius et al. | 424/57 |
| 2005/0121385 A1 | 6/2005 | Demmer et al. | |
| 2009/0001021 A1* | 1/2009 | Witham et al. | 210/660 |
| 2010/0055265 A1* | 3/2010 | Ferlin et al. | 426/311 |
| 2010/0292386 A1 | 11/2010 | Okel | |
| 2011/0036754 A1* | 2/2011 | Cheng et al. | 208/120.01 |
| 2011/0172343 A1 | 7/2011 | Panz et al. | |

OTHER PUBLICATIONS

Barrett, et al., "The determination of pore volume and area distributions in Porous substances. I. Computations and Nitrogen isotherms," J. Am. Chem. Soc., vol. 73 (Jan. 1951), p. 373-380.*

* cited by examiner

*Primary Examiner* — Chester Barry
(74) *Attorney, Agent, or Firm* — The Webb Law Firm

(57) ABSTRACT

The present invention is directed to a separation medium comprising rotary dried or spray dried precipitated silica. The silica has a pore surface area P wherein $\log_{10} P > 2.2$, and the ratio of BET to CTAB is at least 1.0 measured prior to any surface modification of the silica.

The present invention is further directed to a method of separating suspended or dissolved materials from a fluid stream, comprising contacting the stream with the separation medium described above.

23 Claims, No Drawings

US 9,073,041 B2

PRECIPITATED SILICA SORBENTS AND METHOD OF SEPARATING MATERIALS FROM A FLUID STREAM

CROSS REFERENCE TO RELATED APPLICATIONS

This application claims the benefit of U.S. Provisional Patent Application No. 61/555,508, filed on Nov. 4, 2011.

STATEMENT REGARDING FEDERALLY SPONSORED RESEARCH AND DEVELOPMENT

This invention was made with Government support under Contract No, W9132T-09C-0046 awarded by the Engineer Research Development Center Construction Engineering Research Laboratory ("ERDC-CERL"). The United States Government may have certain rights in this invention.

FIELD OF THE INVENTION

The present invention relates to silica sorbents useful in filtration and adsorption membranes and in fluid purification processes.

BACKGROUND OF HE INVENTION

Accessibility to clean and potable water is a concern throughout the world, particularly in developing countries. The search for low-cost, effective filtration media and processes is ongoing. Filtration media that can remove both macroscopic and molecular contaminants are particularly desired including those that can remove both hydrophilic and hydrophobic contaminants at, low cost and high flux rate.

It would be desirable to provide novel sorbents suitable for use on liquid or gaseous streams that serve to remove contaminants via both chemisorption and physisorption.

SUMMARY OF THE INVENTION

The present invention is directed to a separation medium comprising rotary dried or spray dried precipitated silica. The silica has a pore surface area P (having units of $m^2/g$) wherein $\log_{10} P > 2.2$, and the ratio of BET to CTAB is at least 1.0 measured prior to any surface modification of the silica.

The present invention is further directed to a method of separating suspended or dissolved materials from a fluid stream, comprising contacting the stream with the separation medium described above.

DETAILED DESCRIPTION OF THE INVENTION

Other than in any operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used in this specification and the appended claims, the articles "a," "an," and the include plural referents unless expressly and unequivocally limited to one referent.

The various embodiments and examples of the present invention as presented herein are each understood to be non-limiting with respect to the scope of the invention.

As used in the following description and claims, the following terms have the meanings indicated below:

By "polymer" is meant a polymer including homopolymers and copolymers, and oligomers. By "composite material" is meant a combination of two or more differing materials.

As used herein, "formed from" denotes open, e.g., "comprising," claim language. As such, it is intended that a composition "formed from" a list of recited components be a composition comprising at least these recited components, and can further comprise other, nonrecited components, during the composition's formation.

As used herein, the term "polymeric inorganic material" means a polymeric material having a backbone repeat unit based on an element or elements other than carbon. For more information see James Mark et al., Inorganic Polymers, Prentice Hail Polymer Science and Engineering Series, (1992) at page 5, which is specifically incorporated by reference herein. Moreover, as used herein, the term "polymeric organic materials" means synthetic polymeric materials, semisynthetic polymeric materials and natural polymeric materials, all of which have a backbone repeat unit based on carbon.

An "organic material," as used herein, means carbon containing compounds wherein the carbon is typically bonded to itself and to hydrogen, and often to other elements as well, and excludes binary compounds such as the carbon oxides, the carbides, carbon disulfide, etc.; such ternary compounds as the metallic cyanides, metallic carbonyls, phosgene, carbonyl sulfide, etc.; and carbon-containing ionic compounds such as metallic carbonates, for example calcium carbonate and sodium carbonate. See R. Lewis, Sr., Hawley's Condensed Chemical Dictionary, (12th Ed. 1993) at pages 761-762, and M. Silberberg, Chemistry The Molecular Nature of Matter and Change (1996) at page 586, which are specifically incorporated by reference herein.

As used herein, the ter "inorganic material" means any material that is not an organic material.

As used herein, a "thermoplastic" material is a material that softens when exposed to heat and returns to its original condition when cooled to room temperature. As used herein, a "thermoset" material is a material that solidifies or "sets" irreversibly when heated.

As used herein, "microporous material" or "microporous sheet material" means a material having a network of interconnecting pores, wherein, on a coating-free, printing ink-free, impregnant-free, and pre-bonding basis, the pores have a volume average diameter ranging from 0.001 to 0.5 micrometer, and constitute at least 5 percent by volume of the material as discussed herein below.

By "plastomer" is meant a polymer exhibiting both plastic and elastomeric properties.

As noted above, the present invention is directed to a separation medium comprising rotary dried or spray dried precipitated silica. The silica has a pore surface area denoted as P or BJH as described below in the Examples, wherein $\log_{10} P>2.2$. In certain embodiments of the present invention, $\log_{10} P>2.27$, or $\log_{10} P>2.69$, or $\log_{10} P>2.86$.

The present invention is further directed to a method of removing one or more contaminants from a liquid or gaseous stream, comprising contacting the stream with the separation medium described above.

Precipitated silica is usually produced commercially by combining an aqueous solution of a soluble metal silicate, ordinarily alkali metal silicate such as sodium silicate, and an acid so that colloidal particles will grow in weakly alkaline solution and be coagulated by the alkali metal ions of the resulting soluble alkali metal salt. Various acids may be used, including the mineral acids, but the preferred acid is carbon dioxide. In the absence of a coagulant, silica is not precipitated from solution at any pH. The coagulant used to effect precipitation may be the soluble alkali metal salt produced during formation of the colloidal silica particles, it may be added electrolyte such as a soluble inorganic or organic salt, or it may be a combination of both.

Precipitated silica, then, may be described as precipitated aggregates of ultimate particles of colloidal amorphous silica that have not at any point existed as macroscopic gel during the preparation. The sizes of the aggregates and the degree of hydration may vary widely.

Precipitated silica powders differ from silica gels that have been pulverized in ordinarily having a more open structure, that is, a higher specific pore volume. However, the specific surface area of precipitated silica as measured by the Brunauer, Emmet, Teller (BET) method using nitrogen as the adsorbate, is often lower than that of silica gel.

Many different, precipitated silicas may be employed in the present invention, but the preferred precipitated silicas are those obtained by precipitation from an aqueous solution of sodium silicate using a suitable acid such as sulfuric acid, hydrochloric acid, or carbon dioxide. Such precipitated silicas are themselves known and processes for producing them are described in detail in the U.S. Pat. No. 2,940,830 and in West German Offenlegungsschrift No. 35 45 615, the entire disclosures of which are incorporated herein by reference, including especially the processes for making precipitated silicas and the properties of the products.

The precipitated silicas used in the present invention can be produced by a process involving the following successive steps;

(a) an initial stock solution of aqueous alkali metal silicate having the desired alkalinity is prepared and added to (or prepared in) a reactor equipped with means for heating the contents of the reactor, (b) the initial stock solution within the reactor is heated to the desired reaction temperature, (c) acidifying agent and additional alkali metal silicate solution are simultaneously added with agitation to the reactor while maintaining the alkalinity value and temperature of the contents of the reactor at the desired values, (d) the addition of alkali metal silicate to the reactor is stopped, and additional acidifying agent is added to adjust the pH of the resulting suspension of precipitated silica to a desired acid value, (e) the precipitated silica in the reactor is separated from the reaction mixture, washed to remove by-product salts, and (f) dried to form the precipitated silica.

The washed silica solids are then dried using conventional drying techniques. Non-limiting examples of such techniques include oven drying, vacuum oven drying, rotary dryers, spray drying or spin flash drying. Non-limiting examples of spray dryers include rotary atomizers and nozzle spray dryers. Spray drying can be carried out using any suitable type of atomizer, in particular a turbine, nozzle, liquid-pressure or twin-fluid atomizer.

The washed silica solids may not be in a condition that is suitable for spray drying. For example, the washed silica solids may be too thick to be spray dried. In one aspect of the above-described process, the washed silica solids, e.g., the washed filter cake, are mixed with water to form a liquid suspension and the pH of the suspension adjusted, if required, with dilute acid or dilute alkali, e.g., sodium hydroxide, to from 6 to 7, e.g., 6.5, and then fed to the inlet nozzle of the spray dryer.

The temperature at which the silica is dried can vary widely but will be below the fusion temperature of the silica. Typically, the drying temperature will range from above 50° C. to less than 700° C., e.g., from above 100° C., e.g., 200° C., to 500° C. In one aspect of the above-described process, the silica solids are dried in a spray dryer having an inlet temperature of approximately 400° C. and an outlet temperature of approximately 105° C. The free water content of the dried silica can vary, but is usually in the range of from approximately 1 to 10 wt. %, e.g., from 4 to 7 wt. %. As used herein, the term free water means water that can be removed from the silica by heating it for 24 hours at from 100° C. to 200° C., e.g., 105° C.

In one aspect of the process described herein, the dried silica is forwarded directly to a granulator where it is compacted and granulated to obtain a granular product. Dried silica can also be subjected to conventional size reduction techniques, e.g., as exemplified by grinding and pulverizing. Fluid energy milling using air or superheated steam as the working fluid can also be used. The precipitated silica obtained is usually in the form of a powder.

Most often, the precipitated silica is rotary dried or spray dried. Rotary dried silica particles have been observed to demonstrate greater structural integrity than spray dried silica particles. They are less likely to break into smaller particles during extrusion and other subsequent processing during production of the microporous material than are spray dried particles. Particle size distribution of rotary dried particles does not change as significantly as does that of spray dried particles during processing. Spray dried silica particles are more friable than rotary dried, often providing smaller particles during processing. It is possible to use a spray dried silica of a particular particle size such that the final particle size distribution in the membrane does not have a detrimental effect on water flux. In certain embodiments, the silica is reinforced; i.e., has a structural integrity such that porosity is preserved after extrusion. More preferred is a precipitated silica in which the initial number of silica particles and the initial silica particle size distribution is mostly unchanged by stresses applied during membrane fabrication. Most preferred is a silica reinforced such that a broad particle size distribution is present in the finished membrane. Blends of different types of dried silica and different sizes of silica may be used to provide unique properties to the membrane, For example, a blend of silicas with a bimodal distribution of particle sizes may be particularly suitable for certain separation processes. It is expected that external forces applied to silica of any type may be used to influence and tailor the particle size distribution, providing unique properties to the final membrane.

The surface of the particle can be modified in any manner well known in the art, including, but not limited to, chemically or physically changing its surface characteristics using techniques known in the art. For example, the silica may be surface treated with an anti-fouling moiety such as polyethylene glycol, carboxybetaine, sulfobetaine and polymers thereof, mixed valence molecules, oligomers and polymers thereof and mixtures thereof. Another embodiment may be a blend of silicas in which a first silica has been treated with a positively charged moiety and a second silica has been treated with a negatively charged moiety. The silica may also be surface modified with functional groups such as accessible Lewis acid and Lewis base moieties that allow for targeted removal of specific materials such as contaminants in a fluid stream to be purified. By "accessible" is meant chemically accessible by another functional group for chemical reaction. Untreated particles may also be used. Silica particles coated with hydrophilic coatings reduce fouling and may eliminate pre-wetting processing. Silica particles coated with hydrophobic coatings also reduce fouling and may aid degassing and venting of a system.

Precipitated silica typically has an average ultimate particle size of 1 to 100 nanometers. Typically the silica useful in the separation medium of the present invention demonstrates a particle size distribution wherein more than 90 percent of the silica particles have a particle diameter equal to the average particle diameter.

The surface area of the silica particles, both external and internal due to pores, can have an impact on performance. High surface area fillers are materials of very small particle size, materials having a high degree of porosity or materials exhibiting both characteristics. Usually the surface area of the filler itself is in the range of from about 125 to about 700 square meters per gram ($m^2/g$) as determined by the Brunauer, Emmett, Teller (BET) method according to ASTM C 819-77 using nitrogen as the adsorbate but modified by outgassing the system and the sample for one hour at 130° C. Often the BET surface area is in the range of from about 20 to 900 $m^2/g$, such as 190 to 350 $m^2/g$, more often, the silica demonstrates a BET surface area of 125 to 700 $m^2/g$, such as 351 to 700 $m^2/g$.

The BET/CTAB quotient is the ratio of the overall precipitated silica surface area including the surface area contained in pores only accessible to smaller molecules, such as nitrogen (BET), to the external surface area (CTAB). This ratio is typically referred to as a measure of microporosity. A high microporosity value, i.e., a high BET/CTAB quotient number, is a high proportion of internal surface—accessible to the small nitrogen molecule (BET surface area) but not to larger particles—to the external surface (CTAB).

The silica CTAB values may be determined using a CTAB solution and the hereinafter described method. The analysis is performed using a Metrohm 751 Titrino automatic titrator, equipped with a Metrohm interchangeable "Snap-In" 50 milliliter buret and a Brinkmann Probe Colorimeter Model PC 910 equipped with a 550 nm filter. In addition, a Mettler Toledo HB43 or equivalent is used to determine the 105° C. moisture loss of the silica and a Fisher Scientific Centrific™ Centrifuge Model 225 may be used for separating the silica and the residual CTAB solution. The excess CTAB can be determined by auto titration with a solution of Aerosol OT® until maximum turbidity is attained, which can be detected with the probe colorimeter. The maximum turbidity point is taken as corresponding to a millivolt reading of 150. Knowing the quantity of CTAB adsorbed for a given weight of silica and the space occupied by the CTAB molecule, the external specific surface area of the silica is calculated and reported as square meters per gram on a dry-weight basis.

Solutions required for testing and preparation include a buffer of pH 9.6, cetyl [hexadecyl] trimethyl ammonium bromide (CTAB), dioctyl sodium sulfosuccinate (Aerosol OT) and 1N sodium hydroxide. The buffer solution of pH 9.6 can be prepared by dissolving 3.101 g of orthoboric acid (99%; Fisher Scientific, Inc., technical grade, crystalline) in a one-liter volumetric flask, containing 500 milliliters of deionized water and 3.708 grams of potassium chloride solids (Fisher Scientific, Inc., technical grade, crystalline). Using a buret, 36.85 milliliters of the 1N sodium hydroxide solution was added. The solution is mixed and diluted to volume.

The CTAB solution is prepared using 11.0 g±0.005 g of powdered CTAB (cetyl trimethyl ammonium bromide, also known as hexadecyl trimethyl ammonium bromide, Asher Scientific Inc., technical grade) onto a weighing dish. The CTAB powder is transferred to a 2-liter beaker and the weighing dish rinsed with deionized water. Approximately 700 milliliters of the pH 9.6 buffer solution and 1000 milliliters of distilled or deionized water is added to the 2-liter beaker and stirred with a magnetic stir bar. The beaker may be covered and stirred at room temperature until the CTAB powder is totally dissolved. The solution is transferred to a 2-liter volumetric flask, rinsing the beaker and stir bar with deionized water. The bubbles are allowed to dissipate, and the solution diluted to volume with deionized water. A large stir bar can be added and the solution mixed on a magnetic stirrer for approximately 10 hours. The CTAB solution can be used after 24 hours and for only 15 days. The Aerosol (dioctyl sodium sulfosuccinate, Fisher Scientific Inc., 100% solid) solution may be prepared using 3.46 g±0.005 g, which is placed onto a weighing dish. The Aerosol OT on the weighing dish is rinsed into a 2-liter beaker, which contains about 1500 milliliter deionized water and a large stir bar. The Aerosol OT solution is dissolved and rinsed into a 2-liter volumetric flask. The solution is diluted to the 2-liter volume mark in the volumetric flask. The Aerosol OT® solution is allowed to age for a minimum of 12 days prior to use. The shelf life of the Aerosol OT solution is 2 months from the preparation date.

Prior to surface area sample preparation, the pH of the CTAB solution should be verified and adjusted as necessary to a pH of 9.6±0.1 using 1N sodium hydroxide solution. For test calculations a blank sample should be prepared and analyzed. 5 milliliters of the CTAB solution are pipetted and 55 milliliters deionized water added into a 150-milliliter beaker and analyzed on a Metrohm 751 Titrino automatic titrator. The automatic titrator is programmed for determination of the blank and the samples with the following parameters: Measuring point density=2, Signal drift=20, Equilibrium time=20 seconds, Start volume=0 ml, Stop volume=35 ml, and Fixed endpoint=150 mV. The buret tip and the colorimeter probe are placed just below the surface of the solution, positioned such that the tip and the photo probe path length are completely submerged. Both the tip and photo probe should be essentially equidistant from the bottom of the beaker and not touching one another. With minimum stirring (setting of 1 on the Metrohrn 728 stirrer) the colorimeter is set to 100% T prior to every blank and sample determination and titration initiated with the Aerosol OT® solution. The end point can be recorded as the volume (ml) of titrant at 150 my.

For test sample preparation, approximately 0.30 grams of powdered silica was weighed into a 50-milliliter container containing a stir bar. Granulated silica samples, were riffled (prior to grinding and weighing) to obtain a representative sub sample. A coffee mill style grinder was used to grind granulated materials. Then 30 milliliters of the pH adjusted CTAB solution was pipetted into the sample container containing the 0.30 grams of powdered silica. The silica and CTAB solution was then mixed on a stirrer for 35 minutes. When mixing was completed, the silica and CTAB solution were centrifuged for 20 minutes to separate the silica and excess CTAB solution. When centrifuging was completed, the CTAB solution was pipetted into a clean container minus the separated solids, referred to as the "centrifugate". For sample analysis, 50 milliliters of deionized water was placed into a 150-milliliter beaker containing a stir bar. Then 10 milliliters of the sample centrifugate was pipetted for analysis into the same beaker. The sample was analyzed using the same technique and programmed procedure as used for the blank solution.

For determination of the moisture content, approximately 0.2 grams of silica was weighed onto the Mettler Toledo HB43 while determining the CTAB value, The moisture analyzer was programmed to 105° C. with the shut-off 5 drying criteria. The moisture loss was recorded to the nearest+0.1%.

The external surface area is calculated using the following equation, $$CTAB \text{ Surface Area (dried basis) } [m^2/g] = \frac{(2V_o - V) \times (4774)}{(V_o W) \times (100 - Vol)}$$

wherein, $V_o$=Volume in ml of Aerosol OT® used in the blank titration.

V=Volume in ml of Aerosol OF used in the sample titration,

W=sample weight in grams.

Vol=% moisture loss (Vol represents "volatiles").

Typically, the CTAB surface area of the silica particles used in the present invention ranges from 20 to 700 m²/g, such as 120 to 500 m²/g. Often, the silica demonstrates a CTAB surface area of 170-280 m²/g. More often, the silica demonstrates a CTAB surface area of 281-500 m²/g.

In certain embodiments of the present invention, the BET value of the precipitated silica will be a value such that the quotient of the BET surface area in square meters per gram to the CTAB surface area in square meters per gram is equal to or greater than 1.0, or at least 1.1. Often, the BET to CTAB ratio is 1.0-1.5. More often, the BET to CTAB ratio is 1.5-4.0. Measurements are taken prior to any surface modification of the silica particles.

The BET surface area values reported in the examples of this application were determined in accordance with the Brunauer-Emmet-Teller (BET) method in accordance with ASTM D1993-03. The BET surface area can be determined by fitting five relative-pressure points from a nitrogen sorption isotherm measurement made with a Micromeritics TriStar 3000™ instrument. A flow Prep*060™ station provides heat and a continuous gas flow to prepare samples for analysis. Prior to nitrogen sorption, the silica samples are dried by heating to a temperature of 160° C. in flowing nitrogen (P5 grade) for at least one (1) hour.

The separation media of the present invention are suitable for use in a method separating suspended or dissolved materials from a fluid stream, such as removing one or more contaminants from a fluid (liquid or gaseous) stream, or concentrating desired components in a depleted stream for recirculation through a system. A typical method comprises contacting the stream with the separation medium. When the silica is untreated, the contaminants are primarily adsorbed onto the surface of the separation medium. When the silica has been surface modified with functional groups, contaminants may be chemisorbed or physisorbed to the functional groups and/or degraded by the functional groups.

Contact between the separation medium and the fluid stream may be by passing the fluid stream through a filtration membrane in which the separation medium is impregnated, or otherwise distributed into or applied onto the surfaced thereof. The separation medium may also be in a fluidized bed through which the fluid stream passes. Alternatively, the separation medium may be added to the fluid stream in bulk and later filtered, settled, or otherwise removed from the fluid stream after treatment.

Membranes into which the separation medium may be impregnated are typically polymeric materials such as acrylic, polyester, PVDF, PTFE, microporous materials having a network of interconnecting pores communicating throughout the microporous material. In particular embodiments, microporous materials used in the membranes of the present invention comprise a polyolefin matrix (a). Polyolefins are polymers derived from at least one ethylenically unsaturated monomer. In certain embodiments of the present invention, the matrix comprises a plastomer. For example, the matrix may comprise a plastorner derived from butene, hexene, and/or octene. Suitable piastomers are available from ExxonMobil Chemical under the tradename "EXACT".

In certain embodiments of the present invention, the matrix comprises a different polymer derived from at least one ethylenically unsaturated monomer, which may be used in place of or in combination with the plastomer Examples include polymers derived from ethylene, propylene, and/or butene, such as polyethylene, polypropylene, and polybutene. High density and/or ultrahigh molecular weight polyolefins such as high density polyethylene are also suitable.

In a particular embodiment of the present invention, the polyolefin matrix comprises a copolymer of ethylene and butene.

Non-limiting examples of ultrahigh molecular weight (UHMW) polyolefin can include essentially linear UHMW polyethylene or polypropylene. Inasmuch as UHMW polyolefins are not thermoset polymers having an infinite molecular weight, they are technically classified as thermoplastic materials.

The ultrahigh molecular weight polypropylene can comprise essentially linear ultrahigh molecular weight isotactic polypropylene. Often the degree of isotacticity of such polymer is at least 95 percent, e.g., at least 98 percent.

While there is no particular restriction on the upper limit of the intrinsic viscosity of the UHMW polyethylene, in one non-limiting example, the intrinsic viscosity can range from 18 to 39 deciliters/gram, e.g. from 18 to 32 deciliters/gram. While there is no particular restriction on the upper limit of the intrinsic viscosity of the UHMW polypropylene, in one non-limiting example, the intrinsic viscosity can range from 6 to 18 deciliters/gram, e.g., from 7 to 16 deciliters/gram.

For purposes of the present invention, intrinsic viscosity is determined by extrapolating to zero concentration the reduced viscosities or the inherent viscosities of several dilute solutions of the UHMW polyolefin where the solvent is freshly distilled decahydronaphthalene to which 0.2 percent by weight, 3,5-di-tert-butyl-4-hydroxyhydrocinnamic acid, neopentanetetrayl ester [CAS Registry No 6683-19-8] has been added. The reduced viscosities or the inherent viscosities of the UHMW polyolefin are ascertained from relative viscosities obtained at 135° C. using an Ubbelohde No. 1 viscometer in accordance with the general procedures of ASTM D 4020-81, except that several dilute solutions of differing concentration are employed.

The nominal molecular weight of UHMW polyethylene is empirically related to the intrinsic viscosity of the polymer in accordance with the following equation, $$M = 5.37 \times 10^4 [\acute{\eta}]^{1.37}$$

wherein M is the nominal molecular weight and $[\acute{\eta}]$ is the intrinsic viscosity of the UHMW polyethylene expressed in deciliters/gram. Similarly, the nominal molecular weight of UHMW polypropylene is empirically related to the intrinsic viscosity of the polymer according to the following equation:

$$M = 8.88 \times 10^4 [\acute{\eta}]^{1.25}$$

wherein M is the nominal molecular weight and $[\acute{\eta}]$ is the intrinsic viscosity of the UHMW polypropylene expressed in deciliters/gram.

A mixture of substantially linear ultrahigh molecular weight polyethylene and lower molecular weight polyethylene can be used. In certain embodiments, the UHMW polyethylene has an intrinsic viscosity of at least 10 deciliters/gram, and the lower molecular weight polyethylene has an ASTM D 1238-86 Condition E melt index of less than 50 grams/10 minutes, e.g., less than 25 grams/10 minutes, such as less than 15 grams/10 minutes, and an ASTM D 1238-86 Condition F melt index of at least 0.1 gram/10 minutes, e.g., at least 0.5 gram/10 minutes, such as at least 1.0 gram/10 minutes. The amount of UHMW polyethylene used (as weight percent) in this embodiment is described in column 1, line 52 to column 2, line 18 of U.S. Pat. No. 5,196,262, which disclosure is incorporated herein by reference. More particularly, the weight percent of UMW polyethylene used is described in relation to FIG. 6 of U.S. Pat. No. 5,196,262; namely, with reference to the polygons ABCDEF, GHCI or JHCK of FIG. 6, which Figure is incorporated herein by reference.

The nominal molecular weight of the lower molecular weight polyethylene (LMWPE) is lower than that of the UHMW polyethylene. LMWPE is a thermoplastic material and many different types are known. One method of classification is by density, expressed in grams/cubic centimeter and rounded to the nearest thousandth, in accordance with ASTM D 1248-84 (Reapproved 1989). Non-limiting examples of the densities of LMWPE are found in the following Table 1.

TABLE 1

| Type | Abbreviation | Density, g/cm³ |
|---|---|---|
| Low Density Polyethylene | LDPE | 0.910-0.925 |
| Medium Density Polyethylene | MDPE | 0.926-0.940 |
| High Density Polyethylene | HDPE | 0.941-0.965 |

Any or all of the polyethylenes listed in Table 1 above may be used as the LMWPE in the matrix of the microporous material. HDPE may be used because it can be more linear than MDPE or LDPE. Processes for making the various LMWPE's are well known and well documented. They include the high pressure process, the Phillips Petroleum Company process, the Standard Oil Company (Indiana) process, and the Ziegler process. The ASTM D 1238-86 Condition E (that is, 190° C. and 2.16 kilogram load) melt index of the LMWPE is less than about 50 grams/10 minutes. Often the Condition E melt index is less than about 25 grams/10 minutes. The Condition E melt index can be less than about 15 grams/10 minutes. The ASTM D 1238-86 Condition F (that is, 190° C. and 21.6 kilogram load) melt index of the LMWPE is at least 0.1 gram/10 minutes. In many cases the Condition F melt index is at least 0.5 gram/10 minutes such as at least 1.0 gram/10 minutes.

The UHMWPE and the LMWPE may together constitute at least 65 percent by weight, e.g., at least 85 percent by weight, of the polyolefin polymer of the microporous material. Also, the UHMWPE and LMWPE together may constitute substantially 100 percent by weight of the polyolefin polymer of the microporous material.

In a particular embodiment of the present invention, the microporous material can comprise a polyolefin comprising ultrahigh molecular weight polyethylene, ultrahigh molecular weight polypropylene, high density polyethylene, high density polypropylene, or mixtures thereof.

If desired, other thermoplastic organic polymers also may be present in the matrix of the microporous material provided that their presence does not materially affect the properties of the microporous material substrate in an adverse manner. The amount of the other thermoplastic polymer which may be present depends upon the nature of such polymer. In general, a greater amount of other thermoplastic organic polymer may be used if the molecular structure contains little branching, few long side chains, and few bulky side groups, than when there is a large amount of branching, many long side chains, or many bulky side groups. Non-limiting examples of thermoplastic organic polymers that optionally may be present in the matrix of the microporous material include low density polyethylene, high density polyethylene, poly(tetrafluoroethylene), polypropylene, copolymers of ethylene and propylene, copolymers of ethylene and acrylic acid, and copolymers of ethylene and methacrylic acid. If desired, all or a portion of the carboxyl groups of carboxyl containing copolymers can be neutralized with sodium, zinc or the like. Generally, the microporous material comprises at least 70 percent by weight of UHMW polyolefin, based on the weight of the matrix. In a non-limiting embodiment, the above-described other thermoplastic organic polymer are substantially absent from the matrix of the microporous material.

Materials that can be removed from a fluid stream using the separation medium may be solid particulates or dissolved organic and/or inorganic molecules. Examples include toxins, such as neurotoxins; heavy metal; hydrocarbons; oils; dyes; neurotoxins; pharmaceuticals; and/or pesticides.

The following examples are intended to illustrate various embodiments of the invention, and should not be construed as limiting the invention in any way.

EXAMPLES

Whereas particular embodiments of this invention have been described above for purposes of illustration, it will be evident to those skilled in the art that numerous variations of the details of the present invention may be made without departing from the scope of the invention as defined in the appended claims.

Part 1 describes the procedures used for the analytical testing of Examples 1-4 and Comparative Examples 1-4, Part 2 describes the preparation of Examples and Comparative Example. Part 3 describes the properties of the Examples and Comparative Examples. Part 4 describes performance testing with a relevant chemical contaminant, paraquat. Part 5 provides an analysis of the data.

Part 1—Analytical Testing

The following surface area method uses a cetyltrimethylammonium bromide (CTAB) solution for analyzing the external specific surface area of treated filler according to this invention. All silicas were commercially available with the exception of Examples 1 and 4 are listed in Table 1. The analysis was performed using a Metrohm 751 Titrinc automatic titrator, equipped with a Metrohm Interchangeable "Snap-In" 50 milliliter buret and a Brinkrnann Probe Colorimeter Model PC 910 equipped with a 550 nm filter. In addition, a Mettler Toledo H843 was used to determine the moisture loss of the filler and a Fisher Scientific Centrific™ Centrifuge Model 225 for separation of the filler and the residual CTAB solution. The excess CTAB was determined by auto titration with a solution of Aerosol® OT surfactant, reported to be sodium sulfosuccinate until maximum turbidity was attained which was detected with the probe colorimeter. The maximum turbidity point was taken as corresponding to a millivolt reading of 150. Knowing the quantity of CTAB adsorbed for a given weight of filler and the space occupied by the CTAB molecule enabled calculation of the external specific surface area of the treated filler which was reported as square meters per gram on a dry-weight basis in Table 2.

Solutions required for testing and preparation included a buffer of pH 9.6, CTAB solution, Aerosol OT surfactant and 1N sodium hydroxide. The buffer solution of pH 9.6 was prepared by dissolving 3.101 g of orthoboric acid (99%; Fisher Scientific, Inc., technical grade, crystalline) in a one-liter volumetric flask, containing 500 milliliter of deionized water and 3.708 g of potassium chloride solids (Fisher Scientific, Inc., technical grade, crystalline). Using a buret, 36.85 milliliter of the 1N sodium hydroxide solution was added. The solution was mixed and diluted to volume. The CTAB solution was prepared using 11.0 g of the powdered CTAB, Fisher Scientific Inc., technical grade) onto a weighing dish. The CTAB powder was transferred to a 2-liter beaker, rinsing the weighing dish with deionized water. Approximately 700 milliliter of the pH 9.6 buffer solution and 1000 milliliter of distilled or deionized water was added into the 2-liter beaker and stirred with a magnetic stir bar. A large watch glass was placed on the beaker and the beaker was stirred at room temperature until the CTAB was totally dissolved. The solution was transferred to a 2-liter volumetric flask rinsing the beaker and stir bar with deionized water. The bubbles were allowed to dissipate, and diluted to volume with deionized water. A large stir bar was added and mixed on a magnetic stirrer for approximately 10 hours. The (Aerosol OT® surfactant Fisher Scientific Inc., 100% solid) solution was prepared using 3.46 g onto a weighing dish. The Aerosol® OT was rinsed into a 2 liter beaker which contained about 1500 milliliter deionized water and a large stir bar. The Aerosol® OT solution was dissolved and rinsed into a 2-liter volumetric flask. The solution was diluted to 2-liter volume mark in the volumetric flask. The Aerosol® OT solution was allowed to age for a minimum of 12 days prior to use was used prior to the expiration date of 2 months from the preparation date.

Prior to surface area sample preparation, the pH of the CTAB solution was verified and adjusted to a pH of 9.6±0.1 using 1N sodium hydroxide solution. For test calculations a blank sample was prepared and analyzed. 5 milliliters CTAB solution was pipetted and 55 milliliters deionized water was added into a 150-milliliter beaker and analyzed on a Metrohm 751 Titrino automatic titrator. The automatic titrator was programmed for determination of the blank and the samples with following parameters: Measuring point density=2, Signal drift=20, Equilibrium time=20 seconds, Start volume=0 ml, Stop volume=35 ml, and Fixed endpoint=150 mV. The buret tip and the colorimeter probe were placed just below the surface of the solution, positioned such that the tip and the photo probe path length were completely submerged. Both the tip and photo probe were essentially equidistant from the bottom of the beaker and not touching one another. With minimum stirring (setting of 1 on the Metrohm 728 stirrer) the colorimeter was set to 100% T prior to every blank and sample determination and titration was initiated with the Aerosol® OT solution. The end point was recorded as the volume (mL) of titrant at 150 mV.

For test sample preparation, approximately 0.30 grams of powdered filler was weighed into a 50-milliliter container with a stir bar. The pH adjusted CTAB solution (30 milliliters) was pipetted into the sample container with the 0.30 grams of powdered filler. The filler and CTAB solution was then mixed on a stirrer for 35 minutes. When mixing as completed, the filler and CTAB solution was centrifuged for 20 minutes to separate the filler and excess CTAB solution. When centrifuging was completed, the CTAB solution was pipetted into a clean container minus the separated solids, referred to as the "centrifugate". For sample analysis, 50 milliliters of deionized water was placed into a 150-milliliter beaker with a stir bar. 10 milliliters of the sample centrifugate was pipetted for analysis into the same beaker. The sample was analyzed using the same technique and procedure described herein.

For determination of the moisture content, approximately 0.2 grams of silica was weighed onto the Mettler Toledo HB43 while determining the CTAB value. The moisture analyzer was programmed to 105° C. with the shut-off 5 drying criteria. The moisture loss was recorded to the nearest +0.1%. The external surface area was calculated using the following equation, $$CTAB\ \text{Surface Area (dried basis)}\ [m^2/g] = \frac{(2V_o - V) \times (4774)}{(V_o W) \times (100 - Vol)}$$

wherein,
Vo=Volume in ml of Aerosol OT® used in the Blank titration.
V=Volume in ml of Aerosol OT® used in the sample titration,
W=sample weight in grams.
Vol=% moisture loss (Vol represents "volatiles").

The BET surface area values reported in the examples of this application were determined in accordance with the Brunner-Emmet-Teller (BET) method in accordance with ASTM D1993-03. The BET surface area can be determined by fitting five relative pressure points from a nitrogen sorption isotherm measurement made with a Micromiretics TriStar 3000™ and Prep-060™ equipment.

In these examples, the term "microporosity" will be used. It is generally known that the nitrogen adsorbates used in BET surface area measurements can access regions of a porous material that larger molecules such as CTAB cannot due to size exclusion. Thus, the ratio BET/CTAB can provide some indication of the level of small pores in a precipitated silica. In a comparison of materials with varying BET/CTAB ratios, as the ratio increases the microporosity is said to increase.

The BJH (Barret-Joyner-Halenda) analysis, as known to one skilled in the art, is initiated to determine pore area and specific pore volume utilizing the nitrogen desorption isotherm across multiple relative pressures. One such usage is to allow for the investigation of pore size contributions to an overall surface area. Typically a minimum of 60 points are recorded and analyzed by the instrument software for these analyses. BJH, also referred to as P herein, represents the pore surface area. The log base 10 of P or BJH is reported in Table 2.

Na$_2$O Titration:
1. Pipette 20 ml of the sample to be tested.

2. Discharge contents of the pipette into a beaker equipped with a magnetic stir bar.
3. Dilute the sample in the beaker with roughly 100 ml of deionized water.
4. Place the beaker on a magnetic stir plate and agitate the sample moderately.
5. Add approximately 10 drops of Methyl Orange-Xylene Cyanole indicator. The color of the solution in the beaker should be green.
6. Titrate with 0.645N HCl from a 50 ml burette. End of titration will be indicated when the color of the solution turns purple.
7. Read the milliliters of 0.645N HCl added. This value is the grams per liter of Na2O in the sample.

Part 2—Preparation of Examples 1 and 4 and Identification of Examples 2-3 and Comparative Examples (CE) 1-4
Precipitation Equipment Used for Example 1

The reactor was a round bottom 150 liter stainless steel tank. The tank had two 5 cm baffles placed vertically on opposite sides of the inside of the tank for added mixing. Heating was via steam coils located 46.4 cm down from the top of the tank. The tank had two agitators. Main agitation was accomplished via an Ekato MIG style blade and a secondary high speed agitator was used for acid addition with a cowles style blade turning at 1750 RPM. The secondary high speed agitator was only run when acid was being added to the tank.
Raw Materials Used for Example 1:
Sodium silicate—84 g/l Na2O with a $SiO_2/Na_2O$ ratio of 3.2
Sulfuric acid—96%, 36 N

Example 1

90.0 Liters of water was added to the 150 L reactor tank and heated to 67° C. via indirect steam coil heat. 8.4 L of sodium silicate was added at a rate of 844 mL/min to achieve an $Na_2O$ concentration of 7.2 g/L. The $Na_2O$ concentration was confirmed by titrating the sodium silicate/water mixture using the $Na_2O$ titration method described above. The temperature was adjusted as necessary to 67° C. via indirect steam coil heating and the precipitation step was initiated. The 150 liter reactor was agitated via the main tank agitator.

The main agitator was left on and a simultaneous addition precipitation step was started 38.0 liters of sodium silicate and 2.3 liters of sulfuric acid were added simultaneously over a period of 90 minutes. The sodium silicate was added via an open tube near the bottom of the tank at a rate of 422 ml/min and the sulfuric acid was added directly above the secondary high speed mixer blades. The acid addition rate averaged 25.0 ml/min over the course of the 90 minute simultaneous addition step.

At the end of the simultaneous addition step the pH of the solution was adjusted to 4.0 using sulfuric acid within 15 minutes. The mixture was pumped into a filter press and washed until the conductivity of the rinse water measured less than 1000 microsiemens. The resulting filter cake was reslurried with water to form a pumpable slurry and spray dried using a Niro spray drier (Utility Model 5 with Type FU-11 rotary atomizer, Niro Inc).

Example 4

Example 4 was synthesized according to the conditions set forth in U.S. Pat. No. 8,114,935 B2 Example #3, which disclosure is incorporated herein by reference. The finished silica was in the form of granules and was milled to an average particle size of 17 microns using a Hosokawa Air Classifier Mill (ACM), Model: ACM2.

Table 1 lists the identity of the Silica sources used to produce the Examples and Comparative Example

| Example # | Commercially Available As: |
|---|---|
| CE-2 | Hi-Sil ™ 135 |
| CE-3 | Hi-Sil ™ WB37 |
| 2A | Lo-Vel ™ 4000 BATCH 1 |
| 2B | Lo-Vel ™ 4000 BATCH 2 |
| 3A | Lo-Vel ™ 6000 BATCH 1 |
| 3B | Lo-Vel ™ 6000 BATCH 2 |
| CE-4 | Hi-Sil ™ ABS |
| CE-1 | Hi-Sil ™ SP-190 |

Part 3—Properties of the Examples and Comparative Example

TABLE 2

Surface Properties of Examples 1-4 and Comparative Examples 1-4

| Example # | BET-5 ($m^2/g$) | CTAB ($m^2/g$) | BET/CTAB (microporosity) | BJH Desorption SA (pores 1.7-300 nm) ($m^2/g$) | $\log_{10}$ BJH Desorption SA (pores 1.7-300 nm) ($m^2/g$) |
|---|---|---|---|---|---|
| 1 | 357.0 | 188.0 | 1.90 | 188.0 | 2.27 |
| CE-2 | 149.0 | 142.0 | 1.05 | 134.17 | 2.13 |
| CE-3 | 150.0 | 150.0 | 1.00 | 134.7 | 2.13 |
| 2A | 426.0 | 327.0 | 1.30 | 487.7 | 2.69 |
| 3A | 655.0 | 420.0 | 1.56 | 728.5 | 2.86 |
| 2B | 552.0 | 339.0 | 1.63 | 650.8 | 2.81 |
| 3B | 644.0 | 402.0 | 1.60 | 727.8 | 2.86 |
| CE-4 | 126.0 | 135.0 | 0.93 | 111.42 | 2.05 |
| 4 | 281.0 | 200.0 | 1.41 | 205.66 | 2.31 |
| CE-1 | 179.0 | 170.0 | 1.05 | 156.98 | 2.20 |

Part 4—Performance Testing

It is generally accepted that as the surface area of an adsorbate increases, more of the adsorbate volume is accessible. This means that even in cases where there is no chance for covalent interaction between the adsorbate and adsorbent, the adsorbate could be removed from solution by Van der Waal interactions, hydrogen bonding, pi interactions or dipole-dipole interactions. Thus, it would be expected when intermolecular forces are strong enough to retain adsorbents from solution, the adsorption capacity would increase with increased surface area. It is hypothesized that a adsorbate possessing smaller pores would be even better since physically trapping the molecule could be possible and the cumulative effect of intermolecular forces would likely be maximized.

The silica adsorption capability toward, paraquat, a relevant chemical contaminant, was assessed using a spectrophotometric method. Paraquat dichloride was purchased from Sigma Aldrich and used as received. After initial work was completed to determine the working range (detection limits) in aqueous solution, it was determined that borate buffered (0.025M) alkaline (pH=8.06) solutions of paraquat could be accurately measured between 0 and 25 ppm by following the intensity of the $\pi \rightarrow \pi^*$ electronic transition at 258 nm. Once establishing a relationship between absorbance and paraquat concentration using stock solutions, the electronic absorption intensity after exposure to an adsorbent correlates to the concentration remaining in solution. This calculation was completed using the well known Beer's Law equation. For the determination of adsorption capacity, 25 PPM aqueous solutions were prepared and 1.67 grams of silica were added. A sample was taken at various times and a spectrum was recorded. All work for this project was performed using an HP 8542A diode array spectrophotometer.

TABLE 2

The Final Paraquat Concentration and Adsorption Capacity

| Example # | Final Paraquat Concentration (ppm) | Adsorption Capacity (ppm/g) |
|---|---|---|
| 1 | 1.2 | 14.3 |
| CE-2 | 14.2 | 6.5 |
| CE-3 | 13 | 7.2 |
| 2A | 5.6 | 11.6 |
| 3A | 3.1 | 13.1 |
| 2B | 1.9 | 13.8 |
| 3B | 1.7 | 14.0 |
| CE-4 | 16.6 | 5.0 |
| 4 | 9.7 | 9.2 |
| CE-1 | 11.5 | 8.1 |

Part 5—Data Analysis

Based on surface area alone, it would be expected that Example 3A would have the greatest adsorption capacity. However this was not the case. Example 3B which has slightly lower BET and CTAB surface areas due to subtle differences in processing equipment, but a greater amount of microporosity (BET/CTAB ratio) is able to remove more paraquat from solution. Furthermore, Example 1 which has almost half the surface area, but a notably greater BET/CTAB ratio than Examples 3A and 3B is able to reduce the paraquat concentration to lower levels than either Examples 3A or 3B.

An x,y scatter plot (two dimensional) of the $\log_{10}$ BJH pore surface area of pores 1.7 nm-300 nm and the adsorption capacity shows a mostly linear relationship with Example 1 clearly outside of the trend. This silica was deliberately synthesized to have a lower surface area than Examples 2A, 2B, 3A and 3B with a significantly higher amount of microporosity. Example 3B also defies the trend because it has lower BET and CTAB surface areas than Example 3A yet greater microporosity and a resultant greater adsorption capacity. Two dimensional scatter plots of the $\log_{10}$ CTAB surface area vs. adsorption capacity and the microporosity ratio (BET/CTAB) were also generated. A linear trendline was fit to the data including Examples 1 and 3B and without Examples 1 and 3B. The strength of the relationship can be evaluated by the coefficient of determination or $R^2$. The term $R^2$ is the proportion of variability within a statistical model (in this case the best fit line) that is accounted for by the model. An $R^2$ value of 1.0 would indicate that the model perfectly describes the system being studied and is rarely encountered in real world processes. In other words, 100% of the change in one variable can be explained by change in the other variable.

TABLE 3

Data Analysis of x,y Scatter Plot

| X variable | Y variable | $R^2$ = # below (With Examples 1 and 3A) | $R^2$ = # below (Without Examples 1 and 3A) |
|---|---|---|---|
| $\log_{10}$ BJH (1.7 nm-300 nm) | Adsorption Capacity | 0.67 | 0.96 |
| $\log_{10}$ CTAB | Adsorption Capacity | 0.68 | 0.94 |
| $\log_{10}$ BET/CTAB | Adsorption Capacity | 0.90 | 0.87 |

The fact that the fit for BJH and CTAB improved with the removal of Examples 1 and 3A from the plot indicates that increased surface area by itself will tend to increase the adsorption capacity of paraquat linearly so long as the BET and OTAB are trending linearly or the microporosity is changing linearly. However, when the disparity between the BET and the CTAB surface area increases rapidly, micropores present in the silica compensated for the loss of surface area and trapped adsorbate molecules. In the present invention, while surface area is important, microporosity was maximized for the design of optimal sorbent materials. This was especially evident in fact that the above microporosity model explained 90% of the change in adsorption capacity in all the Examples.

What is claimed is:

1. A separation medium comprising rotary dried or spray dried precipitated silica, said silica having a pore surface area P wherein $\log_{10} P > 2.2$, and wherein the ratio of BET to CTAB is at least 1.0 measured prior to any surface modification of the silica.

2. The separation medium of claim 1 wherein the silica has a particle size distribution wherein more than 90 percent of the silica particles have a particle diameter equal to the average particle diameter.

3. The separation medium of claim 1 wherein the silica demonstrates a BET of 20 to 900 $m^2/g$.

4. The separation medium of claim 3 wherein the silica demonstrates a BET of 125 to 700 $m^2/g$.

5. The separation medium of claim 4 wherein the silica demonstrates a BET of 190 to 350 $m^2/g$.

6. The separation medium of claim 4 wherein the silica demonstrates a BET of 351 to 700 $m^2/g$.

7. The separation medium of claim 1 wherein the silica demonstrates a CTAB of 20 to 700 $m^2/g$.

8. The separation medium of claim 7 wherein the silica demonstrates a CTAB of 120 to 500 $m^2/g$.

9. The separation claim 8 wherein the silica demonstrates a CTAB of 170 to 280 $m^2/g$.

10. The separation medium of claim 8 wherein the silica demonstrates a CTAB of 281 to 500 $m^2/g$.

11. The separation medium of claim 2 wherein the ratio of BET to CTAB is at least 1.1.

12. The separation medium of claim 2 wherein the ratio of BET to CTAB is 1.0-1.5.

13. The separation medium of claim 2 wherein the ratio of BET to CTAB is 1.5-4.0.

14. The separation medium of claim 1, wherein the silica has been surface treated with an anti-fouling moiety selected from polyethylene glycol, carboxybetaine, sulfobetaine and polymers thereof, mixed valence molecules, oligomers and polymers thereof and all blends of said species.

15. The separation medium of claim 1, wherein the silica comprises a blend of silicas wherein a first silica has been treated with a positively charged moiety and a second silica has been treated with a negatively charged moiety.

16. The separation medium of claim 1, wherein the silica has been surface modified with accessible Lewis acid and Lewis base moieties.

17. A method of separating suspended or dissolved materials from a fluid stream, comprising contacting the stream with the separation medium of claim 1.

18. The method of claim 17, wherein the silica is untreated and the material to be separated from the fluid stream is adsorbed onto the surface of the separation medium.

19. The method of claim 17 wherein the silica has been surface modified with functional groups and the material to be separated from the fluid stream is chemisorbed or physisorbed to the functional groups and/or degraded by the functional groups.

20. The method of claim 17 wherein the material to be separated from the fluid stream comprises a toxin.

21. The method of claim 17 wherein the material to be separated from the fluid stream comprises a neurotoxin.

22. The method of claim 17 wherein the stream is contacted with the separation medium in a filtration membrane.

23. The method of claim 17 wherein the stream is contacted with the separation medium in a fluidized bed.

* * * * *